United States Patent Office 2,803,638
Patented Aug. 20, 1957

2,803,638
METHOD FOR PREPARING CHLOROPHENYL-CHLOROSILANES

Norman G. Holdstock, Schenectady, N. Y., assignor to General Electric Company, a corporation of New York No Drawing. Application August 18, 1954,
Serial No. 450,806

4 Claims. (Cl. 260—448.2)

This invention is concerned with a method for preparing chlorophenylchlorosilanes by the direct chlorination of a phenylchlorosilane. More particularly, this invention relates to a process for making a chlorophenylchlorosilane containing at least three chlorine atoms attached directly to the phenyl nucleus which process comprises forming a solution of a phenylchlorosilane corresponding to the general formula $$(C_6H_5)_nSiCl_{4-n}$$

where $n$ is an integer equal to from 1 to 2, inclusive, and carbon tetrachloride, there being present on a weight basis at least one part carbon tetrachloride per part phenylchlorosilane, and thereafter introducing chlorine into the phenylchlorosilane solution in the presence of anhydrous aluminum chloride as a catalyst.

Chlorinated phenyl organopolysiloxanes have been found to have improved lubricity characteristics when operating under a load at both high and low temperatures. Thus, in U. S. Patents 2,599,984 and 2,599,917, it has been disclosed that an aryl polysiloxane containing chlorine atoms substituted on an aryl nucleus, particularly a phenyl nucleus in a phenylpolysiloxane, has better lubricity characteristics when employed as a lubricant in bearings operating at extremes of temperature especially under high load, as compared to similar organopolysiloxane lubricants containing silicon-bonded phenyl radicals free of any nuclearly bonded chlorine atoms. In order to prepare chlorinated phenylchlorosilanes which are used in making these chlorophenyl polysiloxanes, it is essential that the chlorophenylchlorosilane be prepared by commercially feasible methods and that the level of chlorination on the phenyl nucleus be sufficiently high, that is, be of the order of at least three chlorine atoms per phenyl nucleus, in order to impart the desired degree of lubricity. In addition, it is also essential in preparing these phenylchlorosilanes that the chlorine on the phenyl nucleus be substituted in place of a hydrogen previously present on the phenyl nucleus instead of being the result of addition of the chlorine across the benzenoid unsaturation. Moreover, the obtaining of these chlorophenylchlorosilanes must be accomplished with minimum losses due, for instance, to the formation of undesirable by-products, cleavage of the benzene ring from the silicon atom, etc.

Previously known methods for chlorinating phenylchlorosilanes have involved use of the Grignard reaction, Friedel-Crafts type reactions, and direct chlorination of the phenylchlorosilanes, as in the aforesaid U. S. Patent 2,599,984—Fletcher et al., where it is suggested that chlorophenylchlorosilanes can be made from phenylchlorosilanes, by direct chlorination of the phenylchlorosilane with chlorine in the presence of FeCl₃ as the catalyst. However, this method as well as other previously known methods for chlorination are unsatisfactory from an economy and yield viewpoint when applied to chlorination of phenylchlorosilanes.

One of the important factors to be considered is the ability to obtain a hydrolyzable chlorophenylchlorosilane used in the preparation of the aforesaid chlorophenylpolysiloxanes in which the phenyl nucleus has an average of at least three chlorine atoms substituted thereon. Attempts to prepare chlorophenylchlorosilanes in which there are present at least three chlorine atoms on the phenyl nucleus employing the usual methods disclosed or taught in the prior art were either impractical or unsatisfactory. Thus, attempts to chlorinate phenyltrichlorosilane directly with gaseous chlorine using ferric chloride as the catalyst even in the presence of a solvent such as carbon tetrachloride gave a product which had an average of at most 2.5 chlorines per phenyl radical and usually was of the order of about 2.1 to 2.2 chlorine atoms per phenyl radical. In addition, the use of ferric chloride as the chlorination catalyst gave no evidence of the formation of tetrachlorophenyltrichlorosilane, and was accompanied by the additional disadvantage that there was a great deal of cleavage of the phenyl nucleus from the silicon atom.

Attempts to use other chlorinating catalysts such as iodine, cuprous chloride, cupric chloride, antimony trichloride, etc. were also unsuccessful for preparing desirable amounts of chlorophenylchlorosilanes or to obtain chlorophenylchlorosilanes having the desired degree of chlorine substitution on the phenyl nucleus. Thus, iodine, which is a well known chlorinating catalyst, was entirely unsatisfactory because the rate of chlorination of the phenylchlorosilanes was extremely slow even when chlorination was made directly into the phenylchlorosilane without any solvent. Moreover, excessive dephenylation occurred employing the iodine as a catalyst. A still further difficulty attendant the use of iodine as a catalyst was the fact that instead of substituting chlorine in place of hydrogen on the phenyl nucleus, the chlorine was added across the double bond of the benzenoid unsaturation so that the products thus obtained were unstable at elevated temperatures. Even well known chlorinating catalysts such as cupric and cuprous chloride showed no effects as far as chlorination of the phenyl nucleus of phenylchlorosilanes was concerned and no chlorophenylchlorosilanes were obtained. Although antimony trichloride did assist the chlorination reaction, nevertheless the level of the number of chlorine atoms on the phenyl nucleus was well below three chlorine atoms per phenyl radical, and, in addition, excessive cleavage of the phenyl group from the silicon atom occurred.

With regard to the solvent aspects of the invention described and claimed in the instant application, it was entirely unexpected that carbon tetrachloride should act so unusually well in the invention when solvents, such as nitroethane and nitrobenzene, ordinarily used in chlorination reactions involving chlorination of phenyl nuclei, either gave no reaction whatsoever when chlorine was passed into a solution of phenyl trichlorosilane dissolved in the solvent, or else again the level of chlorination was too low to be of any value. These results were obtained even though the specific chlorinating agent, namely, aluminum chloride, employed in the practice of the present invention, was also employed with these solvents.

In carrying out my process, I employ a particular combination of ingredients in a specific proportion in order to obtain chlorophenylchlorosilanes in which (1) the average number of phenyl-bonded chlorine atoms averages at least 3, (2) a large proportion of the phenyl nucleus being substituted with 4 chlorine atoms, and (3) there is essentially no chlorine addition across the benzenoid double bond, but rather all the chlorine substitution is in place of phenyl-bonded hydrogen.

As pointed out previously, the solvent used in the practice of the present invention is critical and consists of carbon tetrachloride. The amount of carbon tetrachloride used is also critical if one is to obtain the desired level of phenyl-substituted chlorine. Thus, on a weight ratio, if one employs below 0.5 part carbon tetrachloride per part of phenylchlorosilane to be chlorinated, excessive dephenylation will occur. Generally, I have found that weight ratios of at least 0.75 part carbon tetrachloride to one part phenylchlorosilane are satisfactory, and optimum ranges are of the order of about 1 to 2 parts solvent per part phenylchlorosilane. Although larger ratios of, for example, 4 parts carbon tetrachloride to 1 part phenylchlorosilane or higher may be employed, nevertheless no useful purpose is served and the question of economic utilization of materials and equipment will generally be the limiting factor in these higher ranges of solvent to phenylchlorosilane.

Only aluminum trichloride in the anhydrous form was found to be satisfactory for the practice of the present invention. Again, the concentration of the aluminum trichloride is critical. Generally, the aluminum trichloride should be present, by weight, in an amount equal to from about 0.01 up to the solubility limit of the aluminum trichloride in the carbon tetrachloride which may be up to about 5 to 10 percent. Amounts of aluminum trichloride below 0.01 percent, by weight, based on the weight of the phenylchlorosilane to be chlorinated, markedly reduce the rate of chlorination which can be satisfactorily induced to give the desirable product within a reasonable time.

In carrying out the reaction, the gaseous chlorine is introduced into the solution of the phenylchlorosilane and carbon tetrachloride containing the aluminum trichloride while the solution is preferably maintained at a temperature of about 50° to 100° C., and advantageously at the reflux temperature of the mass. During this operation, anhydrous conditions should be maintained by suitably protecting the reaction mass from the atmosphere in order to avoid undesirable hydrolysis of the formed chlorophenylchlorosilanes or of any of the initial reactants, particularly the phenylchlorosilane.

The rate of addition is not critical and may be varied widely. On a weight basis, the amount of chlorine is advantageously introduced into the phenylchlorosilane solution at the rate of about 0.03 to about 0.2 part chlorine per hour per part of phenylchlorosilane in the solution. Obviously, wider ranges of chlorine introduction may be employed, as, for instance, from about 0.5 to 1 or more parts chlorine per hour per part of phenylchlorosilane.

In carrying out the reaction, the procedure employed is essentially simple. It is only necessary to dissolve the phenylchlorosilane (or mixture of phenylchlorosilanes) in the carbon tetrachloride, add the desired amount of aluminum trichloride, and thereafter pass the chlorine into the reaction mixture preferably from the bottom of the reaction so that the chlorine is diffused throughout the reaction mass. Agitation of the mass is advantageously employed. Thereafter, the reaction mixture is subjected to fractional distillation in order to remove the chlorophenylchlorosilanes formed. Although the heat of reaction as a result of the chlorination will usually be sufficient for purposes of practicing the invention and to cause gentle reflux of the mass, added heating may be employed, if desired, up to temperatures of about 100° C.

I have found that the application of heat in the distillation procedure in the presence of aluminum chloride will effect a certain amount of undesirable cleavage of the phenyl groups from the silicon atom. In order to avoid this, I have found that by adding an amount of sodium chloride at least essentially equivalent to the amount of aluminum chloride originally employed in the reaction mixture, I can effect a complexing of the aluminum chloride with the sodium chloride to render inert the aluminum chloride so that distillation at elevated temperatures can be successfully accomplished without any undesirable dephenylation.

In order that those skilled in the art may better understand how the present invention may be practiced, the following examples are given by way of illustration and not by way of limitation. All parts are by weight.

EXAMPLE 1

In this example, phenyltrichlorosilane was dissolved in varying amounts of carbon tetrachloride and different concentrations of anhydrous aluminum trichloride added while the temperature of the reaction was varied with a maximum temperature of about 70° C. (as a result of the difference in reflux conditions from the heat of reaction). In each instance, the specified amount of phenyltrichlorosilane was mixed with the stated amount of the carbon tetrachloride, the aluminum trichloride catalyst intimately dispersed in the solution, and thereafter chlorine was fed into the agitated reaction mixture from the bottom of the latter by means of an inlet tube. The reaction was conducted under anhydrous conditions by suitably protecting the mixture from the atmosphere. Reflux condensers, also suitably protected from the moisture in the atmosphere, were positioned so that the volatile materials refluxed (solely from the heat of reaction) within the condenser and dropped back into the reaction mixture. The gases formed, particularly the hydrogen chloride which could not be condensed by means of a reflux condenser, were led off together with any excess chlorine from the reaction mass to a scrubber and then absorbed into a tank containing caustic solution. The reaction temperature was maintained by the chlorine rate and was held about 10° C. below the boiling point of carbon tetrachloride (76.8° C.), except in cases where the reaction rate was too slow and this temperature could not be reached. The chlorine was added in equal amounts over the full time of the run. After the reaction was completed, sodium chloride was added to the reaction mixture in an amount essentially equivalent to the amount of aluminum chloride used to complex the latter and to render it inert so that dephenylation would not occur when distillation of the reaction product was undertaken at elevated temperatures. The reaction mixture was then fractionally distilled to isolate the various chlorophenylchlorosilanes produced. As a comparison, other runs were conducted in which similar conditions were used with the exception that instead of employing aluminum trichloride as a catalyst, ferric chloride was used for the same purpose. The manner of conducting the reaction with the ferric chloride as well as the isolation of the product was the same as that used in the runs employing aluminum trichloride as the catalyst. The following Table I shows the results of the various runs conducted using aluminum trichloride and ferric chloride as catalysts.

Table I

| Run No. | $C_6H_5SiCl_3$ | Parts $CCl_4$ | Parts Chlorine Used | Catalyst | Length of Run, Hours | Temp., ° C. | Average [b] Number Chlorines | Percent Weight Hydrolyzable Chlorine |
|---|---|---|---|---|---|---|---|---|
| 1 | 5,000 | 1,000 | 1,360 | None [a] | 25 | 33 | 0.5 | 47.2 |
| 2 | 5,000 | 2,500 | 4,310 | 0.5 part $FeCl_3$ | 29 | 67 | 2.2 | 36.8 |
| 3 | 5,000 | 5,000 | 5,570 | 5 parts $FeCl_3$ | 26.5 | 65 | 2.5 | 35.6 |
| 4 | 5,000 | 2,500 | 4,760 | 5 parts $FeCl_3$ | 27 | 67 | 2.3 | 36.3 |
| 5 | 5,000 | 5,000 | 7,030 | 5 parts $AlCl_3$ | 30 | 67 | 3.6 | 31.5 |
| 6 | 5,000 | 10,000 | 6,250 | 5 parts $AlCl_3$ | 30 | 67 | 3.35 | 32.1 |

[a] Little chlorination which did occur due to traces of iron (converted to $FeCl_3$) in silane previously stored in steel drums.
[b] Determined by hydrolyzing reaction products and titrating the HCl produced on hydrolysis, and thereafter extrapolating the degree of chlorination on the phenyl nucleus.

Analysis of the product obtained in Run No. 2 showed that 86.5 percent of the product obtained was dichlorophenyltrichlorosilane and 11.6 percent was trichlorophenyltrichlorosilane. There was no evidence of any tetrachlorophenyltrichlorosilane. In contrast to this, analysis of Run No. 6 showed that 37.5 percent of the reaction product was dichlorophenyltrichlorosilane, 25.7 percent was trichlorophenyltrichlorosilane and 36.8 percent was tetrachlorophenyltrichlorosilane. It should be noted that any attempts to heat externally the reaction mixture containing ferric chloride as catalyst or to increase the solvent concentration of the ferric chloride reaction will not materially alter the results of the ferric chloride runs described above.

Attempts to effect chlorination of the phenyltrichlorosilane with the aluminum chloride, the phenyltrichlorosilane being dissolved in nitroethane or nitrobenzene, well known solvents used in chlorination reactions, failed to give any apparent reaction between the chlorine and the phenyltrichlorosilane, even though the reaction mixture was brought up to the reflux temperature of the solvents used, for instance, to about 115° C. for nitroethane and about 210° C. for the nitrobenzene.

In order to further evaluate the preparation of chlorophenylchlorosilanes using aluminum trichloride as catalyst and carbon tetrachloride as a solvent, a large run was carried out as follows.

EXAMPLE 2

125 pounds phenyltrichlorosilane and 125 pounds carbon tetrachloride were charged to a 30-gallon kettle fitted with a reflux condenser and also equipped with an outlet to a scrubber. A dip pipe that extended below the surface of the liquid into the kettle was used as a chlorine feed line. The kettle was heated by means of a jacket surrounding the latter. The chlorination was conducted at a chlorine feed rate of about 5 pounds per hour. Chlorination was continued until the reaction started to cool or excess chlorine began to show up in the scrubber. At this point, the temperature was allowed to fall to about 50° C. and about 0.2 pound sodium chloride was added to the kettle to complex the aluminum chloride and to prevent dephenylation during the stripping of the carbon tetrachloride. The kettle was then heated to 200° C. removing the carbon tetrachloride and thereafter the kettle was again cooled to below 80° C. and the residue analyzed to determine the composition of the chlorinated phenyltrichlorosilane. The following Table II shows the results of this run employing 0.1 percent, by weight, aluminum trichloride, based on the weight of the phenyltrichlorosilane as a catalyst for the reaction.

Table II

Feed in pounds:
  Phenyltrichlorosilane _____ pounds__ 126
  Carbon tetrachloride _____ do____ 126
  Chlorine _____ do____ 170
  Average chlorine rate_____ lbs./hr__ 5.3
  Temperature _____ ° C__ 67–72
Products, pounds:
  Chlorophenylchlorosilane mixture ___pounds__ 200
  Carbon tetrachloride_____ do____ 101

Analysis of chlorophenylchlorosilanes:
  Dichlorophenyltrichlorosilanes _____percent__ 19.8
  Trichlorophenyltrichlorosilanes _____do____ 8.1
  Tetrachlorophenyltrichlorosilanes _____do____ 72.1
  Average chlorine number in mixture of chlorophenylchlorosilanes _____ 3.5
  Chlorine utilization_____percent__ 87

EXAMPLE 3

Chlorinated diphenyldichlorosilanes may be prepared in the same manner as described in the foregoing two examples with the exception that diphenyldichlorosilane is substituted in place of the phenyltrichlorosilane used in the preceding examples. By employing these procedures, one will obtain mixtures of chlorinated diphenyldichlorosilanes as, for instance, dichlorodiphenyldichlorosilane, trichlorodiphenyldichlorosilane, tetrachlorodiphenyldichlorosilane, pentachlorodiphenyldichlorosilane, etc., the chlorine atoms being disposed on the phenyl nuclei in various positions.

EXAMPLE 4

In this example, the chlorophenylchlorosilanes prepared above were used to make organopolysiloxane lubricating oils employing for the purpose pure trichlorophenyltrichlorosilane in one instance and tetrachlorophenyltrichlorosilane in another lubricating oil. These two chlorophenylchlorosilanes were obtained by fractional distillation of the reaction products described in Examples 1 and 2 and were found to have the following characteristics:

Table III

| Chlorosilane | Melting Point, °C. | Boiling Point | Hydrolyzable Chlorine | | Total Chlorine | |
|---|---|---|---|---|---|---|
| | | | Found, percent | Theoretical, percent | Found, percent | Theoretical, percent |
| C₆H₂Cl₃SiCl₃ | 49 | 111° C. at 3 mm | 33.86 | 33.78 | 66.6 | 67.7 |
| C₆HCl₄SiCl₃ | 58–60 | 158° C. at 5 mm | 29.2 | 30.45 | 70.7 | 71.0 |

(2,4,5,6-tetrachlorophenyltrichlorosilane.)

More particularly, in one instance 117 grams trichlorophenyltrichlorosilane, 100 grams trimethylchlorosilane, and 373 grams dimethyldichlorosilane were cohydrolyzed in the usual manner by employing an amount of water equal to about 2.5 times the weight of the silanes used. The hydrolysis was carried out with vigorous stirring, and the oily layer which separated was removed and thereafter heated to about 200° C. to remove residual acid and any water which may have been trapped therein. The fluid was allowed to cool and thereafter 0.1 percent, by weight, potassium hydroxide, based on the weight of the organopolysiloxane, was added and the mixture again heated to about 200° C. and maintained at this temperature for about four hours to complete the equilibration. After cooling, about 5 percent, by weight, sodium carbonate was added and the mixture again heated to about 200° C. and allowed to cool. Thereafter the reaction mixture was filtered and distilled under a nitrogen sparge at about 3 to 5 millimeters to a pot temperature of 300° C. to remove the low boiling volatile materials; the residue was identified as "Oil A." The organopolysiloxane fluid containing the tetrachlorophenylsiloxy units was prepared by hydrolyzing a blend of 264.6 parts tetrachlorophenyltrichlorosilane, 2766 parts dimethyldichlorosilane, and 222.6 parts trimethylchlorosilane, and thereafter treating the reaction mixture in the same manner as was done in connection with preparing the organopolysiloxane fluid containing the trichlorophenylsiloxy units; this latter oil was identified as "Oil B." Oil A had a viscosity of 167 centistokes, an Oil B had a viscosity of about 38 centistokes. Each organopolysiloxane fluid was tested on a Navy gear wear tester employing stainless steel or brass using a 5-pound load. Oil A showed a loss of about 11 milligrams per thousand cycles of the gear while Oil B showed a loss of about 6.6 milligrams per thousand cycles gear.

It will, of course, be apparent to those skilled in the art that other chlorinated phenylsiloxy fluids may be prepared employing either pure chlorophenylchlorosilanes or mixtures of the chlorophenylchlorosilanes. The proportions of the latter may be varied with the amount of other copolymerizable organo-hydrolyzable silanes to obtain products of different viscosities and different properties.

The fluids prepared from the chlorophenylchlorosilanes herein described may be modified with various other ingredients especially when used for making lubricants such as, for instance, antioxidants, soaps, such as lithium-2-ethylhexoate (to make greases), inhibitors, etc. In addition to their marked utility in the lubricating field where wear may be greatly reduced especially under high load conditions and at elevated temperatures, the chlorinated phenyl polysiloxanes may also be used as hydraulic fluids and in electrical equipment, for instance, as electrical fluids in such materials as transformers, capacitors, etc.

What I claim as new and desire to secure by Letters Patent of the United States is:

1. The process which comprises forming a solution composed of (a) a phenylchlorosilane corresponding to the general formula $$(C_6H_5)_n SiCl_{4-n}$$

where $n$ is an integer equal to from 1 to 2, inclusive, (b) carbon tetrachloride, and (c) a catalytic amount of aluminum trichloride, there being present on a weight basis at least 0.75 part carbon tetrachloride per part phenylchlorosilane, and thereafter introducing chlorine into the phenylchlorosilane solution to obtain a mixture of chlorophenylchlorosilanes in which the average number of phenyl-bonded chlorine atoms exceeds three such atoms per phenyl group.

2. The process as in claim 1 in which the aluminum chloride is present, by weight, in an amount equal to from about 0.01 to 5 percent, based on the weight of the phenylchlorosilane.

3. The process which comprises (1) forming a solution of phenyltrichlorosilane with a catalytic amount of aluminum trichloride in carbon tetrachloride in which the carbon tetrachloride is present, by weight, in an amount equal to from 1 to 4 parts of the latter per part phenyltrichlorosilane, (2) passing gaseous chlorine through the phenyltrichlorosilane solution to obtain a mixture of chlorophenylchlorosilanes in which the average number of phenyl-bonded chlorine atoms is equal to at least three chlorine atoms per phenyl group, (3) adding a sufficient amount of sodium chloride to the reaction product to form a complex of the aluminum chloride and sodium chloride, and (4) subjecting the mixture of ingredients to distillation to isolate the formed chlorophenylchlorosilanes.

4. The process which comprises (1) forming a solution comprising diphenyldichlorosilane, aluminum trichloride and carbon tetrachloride, the carbon tetrachloride being present, by weight, in an amount equal to from 1 to 4 parts of the latter per part diphenyldichlorosilane and the aluminum chloride being present, by weight, in an amount equal to from 0.01 to 5 percent, based on the weight of the diphenyldichlorosilane, (2) passing gaseous chlorine through the diphenyldichlorosilane solution until there is obtained a mixture of chlorophenylchlorosilanes containing an average of at least three chlorine atoms substituted on the phenyl nucleus for each phenyl group in the reaction mixture, (3) adding a sufficient amount of sodium chloride to the reaction product to form a complex of the aluminum chloride and sodium chloride, and (4) subjecting the mixture of ingredients to distillation to isolate the formed chlorophenylchlorosilanes.

References Cited in the file of this patent

UNITED STATES PATENTS

| | | |
|---|---|---|
| 1,890,772 | Dykstra | Dec. 13, 1932 |
| 2,131,259 | Stoesser | Sept. 27, 1938 |
| 2,258,219 | Rochow | Oct. 17, 1941 |
| 2,716,129 | Wilcock et al. | Aug. 23, 1955 |
| 2,739,165 | Plueddemann | Mar. 20, 1956 |

FOREIGN PATENTS

| | | |
|---|---|---|
| 502,052 | Belgium | Apr. 14, 1951 |
| 673,322 | Great Britain | June 4, 1952 |

OTHER REFERENCES

Norris et al.: "Journal American Chemical Society," volume 62 (1940), pages 1432 to 1435.